Patented Dec. 1, 1936

2,062,866

UNITED STATES PATENT OFFICE 2,062,866

MAKING SODIUM PHOSPHATES

John Harry Coleman, Elizabeth, N. J., assignor to The Warner Chemical Company, New York, N. Y., a corporation of New Jersey No Drawing. Application October 19, 1933, Serial No. 694,343

15 Claims. (Cl. 23—107)

This invention relates to making sodium phosphates; and it comprises a method of making various useful phosphate of soda materials from rock phosphates (natural calcium phosphates) wherein the rock phosphate is attacked by sulfuric acid in amount sufficient to combine with some, but not all, of the calcium, giving a liquor containing acid calcium phosphate and free phosphoric acid, the $P_2O_5$ content is isolated in the form of pure crystallized monosodium phosphate and the crystals are redissolved in water and the solution partially neutralized with sodium carbonate, generally in an amount sufficient to cause about a 75 to 85 per cent conversion into disodium phosphate, thereby giving a new liquid sodium phosphate preparation utilizable in various ways; and it further comprises as a new and useful phosphate of soda preparation such as aqueous liquid containing a major proportion of disodium phosphate and a minor proportion of monosodium phosphate; all as more fully hereinafter set forth and as claimed.

Rock phosphates contain tricalcium phosphate, or "bone phosphate", but are impure materials; they carry gangue and varying amounts of various impurities Iron oxids, alumina, fluorin, magnesia, silica and silicates are usually present. Phosphates of the apatite type carry fluorin as a normal constituent and some fluorin is present in nearly all rock phosphates. Chlorin may replace fluorin in apatite. The phosphates of bone are purer, but not pure. In making pure commercial sodium phosphate from rock phosphates, it is necessary to dispose of these impurities in the simplest, easiest and most economical manner, with the least loss possible of $P_2O_5$ in byproducts. The first step in treating the rock phosphates is always "opening up" with sulfuric acid. This gives an insoluble residue of calcium sulfate and gangue, nearly free of $P_2O_5$. It is discarded. The acid liquor contains the $P_2O_5$ in soluble forms, most of the bases of the rock other than calcium and much of the fluorin as hydrofluosilicic acid. It is usually free of sulfates other than the slight amount of calcium sulfate inevitably going into solution.

In the ordinary way of handling these calcium phosphates for making dodecahydrated disodium hydrogen phosphate ($Na_2HPO_4.12H_2O$), or other commercial phosphates of soda, it has been customary to neutralize the rock liquor directly with soda in amount sufficient to give disodium phosphate. This gives a precipitate called "white mud"; a material of complicated constitution containing phosphates of iron and aluminum and also phosphates of the other bases present. There is a considerable loss of $P_2O_5$ in this precipitate in forms not easily recovered. It is usually sold as a low grade fertilizer. The white mud also contains sodium silicofluorid, but sometimes this is separately recovered by a preliminary precipitation from the acid liquor by the addition of a little sodium carbonate. Sodium silicofluorid is precipitated. The liquor separated from the white mud contains disodium phosphate, but it is quite impure. Disodium phosphate is recovered in pure form by crystallization and separated from the mother liquor; a troublesome operation because of the inconvenient physical properties of the dodecahydrated disodium phosphate. For one thing, it melts in its water of crystallization at temperatures around 105° F. The presence of sodium sulfate at the time of crystallization is avoided, since decahydrated disodium sulfate crystallizes under about the same conditions as the disodium phosphate. For this reason, prior to making the white mud, it is customary to treat the rock liquor with barium compounds to get rid of sulfates. An excess of barium is necessary and this goes into the white mud and contributes to the loss of $P_2O_5$.

In this customary method, it is to be noted that the purification by crystallization is after the disodium phosphate is formed.

In another and companion application, Serial No. 628,112, filed August 9, 1932 (Patent 1,961,127) I have described and claimed an improved method of making commercial phosphate of soda from rock phosphates, one feature of which is that a preliminary purification by crystallization is effected with the $P_2O_5$ in the state of monosodium phosphate. In this crystallization, the presence of sulfates as impurities in the liquor is immaterial, since the monosodium sulfate does not interfere. I can therefore dispense with the use of barium salts for removing sulfates and, as a matter of fact, I find it advantageous to add sodium sulfate to remove calcium as sulfate. In acidifying the rock, I can use merely the amount of sulfuric acid required to bring the $P_2O_5$ to acid calcium phosphate and free phosphoric acid in a ratio of about 1 to 3. To this acid liquor, I can add sodium sulfate in the amount necessary to carry down the calcium, thereby obtaining a marketable calcium sulfate. The sodium sulfate so used is cheaper than sulfuric acid and serves to economize the amount of the latter required. It also serves to furnish sodium for the sodium phosphates. This produces an economy in each way.

The hydrofluosilicic acid in the solution can be preliminarily removed as a sodium salt or as another salt, or it can be allowed to join the calcium sulfate precipitated. There are some advantages in making a fractional precipitation to obtain a first precipitate containing both calcium sulfate and sodium fluosilicate useful as an insecticide.

After the calcium sulfate precipitation by sodium sulfate, the acidity of the liquor is not changed. It still contains the original amount of phosphoric acid and holds in solution the iron and aluminum phosphates. By now neutralizing with sodium carbonate (soda ash) to the point where monosodium phosphate is formed, phosphates of iron and aluminum come down fairly free of other phosphates. There is a comparatively small loss of $P_2O_5$ in this "white mud" and the white mud itself can be economically treated to recover $P_2O_5$ in ways described in the companion application.

The filtered liquid at this time contains monosodium phosphate which can be recovered by concentration and crystallizing out in a pure condition. Impurities are left in the mother liquor. In precipitating calcium compounds by sodium sulfate, any excess of the latter does not interfere with this recovery; it passes forward with the liquor; or, conversely with a deficit in sodium sulfate, some calcium goes forward. The presence either of some calcium or of some sodium sulfate in this liquor at this time is permissible. After taking one or two crops of crystals out of this liquor, it can be recycled.

The pure crystallized monosodium phosphate is redissolved and, in the process as described in the companion application, the pure solution thus obtained is neutralized with soda ash followed by caustic soda to produce a solution of disodium phosphate. This solution is pure and can be used in recovering dodecahydrated disodium phosphate without special precautions. The crystallization of monosodium phosphate leaves any sulfate which may be present in the mother liquor. The liquid being pure, no particular precautions are necessary in obtaining pure commercial phosphate of soda; and several successive crops of pure crystals can be made.

In the invention of another (Neuberg 1,935,575, November 14, 1933), a hot liquid of the composition of dodecahydrated disodium phosphate, that is, containing about 60 per cent water, is directly handled as a liquid, without permitting crystallization. This avoids the expense and inconvenience of crystallizing the dodecahydrate and recovering it as dry crystals. There are also a number of other technical advantages.

The liquid phosphate of soda so produced does not crystallize until the temperature falls below about 115° F. It must be shielded against such a drop in temperature.

I have found that by not completing the neutralization of the monosodium phosphate to disodium phosphate, so that, say, about 15 to 25 per cent of monosodium phosphate remains, I can produce a relatively concentrated liquid phosphate of soda which can be kept at relatively low temperatures without crystallization. This 75 to 85 per cent neutralization corresponds to that which can be readily attained with soda ash. For neutralization beyond 85 per cent, caustic soda is necessary. An 80 per cent neutralization gives a liquid material which can be handled very conveniently as a liquid with a water content of about 50 per cent. The user can convert it into disodium phosphate by an addition of caustic soda or of trisodium phosphate in the right amount.

I have found that this incomplete neutralization of the monosodium phosphate to disodium phosphate is highly useful in producing phosphate of soda products for commercial use as liquid preparations. In so making a liquid disodium phosphate material containing a small amount of monosodium phosphate, a liquid product can be obtained which contains substantially more $P_2O_5$ than the usual commercial disodium phosphate and which can be kept at ordinary temperatures without the difficulties due to crystallization. It is, so to speak, cold proofed. The presence of a small amount of monosodium phosphate restrains the crystallization of disodium phosphate and liquids containing the two salts can be made, kept and handled pending use, which contain substantially less water than the 60 per cent water contained in commercial liquid disodium phosphate dodecahydrate, $Na_2HPO_4.12H_2O$.

In making hydrated disodium phosphates as liquid preparations, direct addition of a minor proportion of monosodium phosphate or, better, neutralization of the greater part, but not all, of monosodium phosphate in solution to disodium phosphate makes it possible to prepare, store and use as a liquid preparation, a solution of sodium phosphate containing water in a proportion not greater than that of the heptahydrated disodium salt, $Na_2HPO_4.7H_2O$. This salt contains 47 per cent water as compared with the 60 per cent water content of the dodecahydrate. A solution in water containing disodium and monosodium phosphates in molecular proportions of 75 per cent disodium to 25 per cent monosodium phosphate in a density of 55° Bé., and containing about 55 per cent of the mixed salts and about 45 per cent water can be kept at temperatures about 102° F. without crystallization. Liquid of this composition has advantages over the liquid dodecahydrate which contains 60 per cent water and begins to crystallize at 115° F.

The incompletely neutralized liquid preparation made as so far described, while having advantages in and of itself, also lends itself to economical methods of manufacturing the various hydrated forms of disodium phosphate. By proper control of conditions any of the three known hydrated forms of disodium phosphate can be crystallized out as a solid phase, leaving monosodium phosphate in the mother liquor. The heptahydrated form is particularly desirable; and it can be obtained from this liquor more readily than from prior known phosphate solutions. The presence of monosodium phosphate in the solution shifts the transition points in the formation of solid crystallized phases of disodium phosphate. Which of the three salts is obtained in the crystallization is, to some extent, a function of the amount of water present. With concentrations of 40° Bé. and under, by proper control of crystallizing conditions, a crop of dodecahydrated disodium phosphate can be obtained. With an 80 per cent neutralization to disodium phosphate and a concentration about 48° Bé., and with cooling to 75° F., a large yield of the heptahydrate may be obtained with only insignificant amounts of the dodecahydrate. With greater concentrations and higher temperatures the dihydrate is deposited.

Crystallization of the various hydrated forms of disodium phosphate from this partially neutralized solution offers an economy. The incomplete neutralization can be effected with carbonate of soda (soda ash), while complete neutralization to disodium phosphate requires the use of caustic soda in completing neutralization, thereby adding to the expense. In crystallizing out disodium phosphate, the monosodium phosphate accumulates in the mother liquors which may be once more neutralized to 80 per cent neutrality by soda ash. The mother liquors being pure, a number of crops of disodium phosphate can be made in this way; that is, without the use of caustic soda.

In the methodical and economical operation of making heptahydrate, a batch of monosodium phosphate solution can be neutralized with soda ash as long as the soda ash will freely react, say, up to about 80 per cent neutralization. On now concentrating and cooling to 75° F. or above, a crop of crystals of the heptahydrated disodium phosphate is obtained. The mother liquor can again be neutralized with soda ash to 80 per cent neutrality and on concentrating, another crop of crystallized heptahydrate can be obtained. This may be repeated indefinitely, since the liquid formed by dissolving the crystallized monosodium phosphate in water is pure.

To recapitulate, in the present invention, I produce liquid phosphate of soda preparations which are relatively high in $P_2O_5$ content and low in water content, this being advantageously done by partially neutralizing concentrated solutions of monosodium phosphate. These preparations can, however, be made by dissolving the two salts in water in the desired proportions and concentrating the solution to the desired density. But it is more direct and economical to dissolve monosodium phosphate crystals in suitable concentration and to neutralize to the desired proportion of disodium phosphate by an addition of sodium carbonate (soda ash).

For restricting crystallization of disodium phosphate, neutralization of the monosodium solution to 85 per cent disodium, leaving unneutralized 15 per cent of the monosodium phosphate, may be sufficient. Such a solution of 48° Bé. density and containing about 50 per cent water begins to crystallize at 114° F. An 80 per cent neutralization has some advantage in being readily brought about by addition of soda ash to a solution containing monosodium phosphate in high concentration with heating and stirring. However, a more concentrated phosphate having a still lower crystallization point can be obtained by limiting the neutralization still further and leaving a greater proportion of the monosodium compound in the liquid. For example, by stopping the neutralization at 75 per cent and leaving 25 per cent of the monosodium phosphate, a liquid can be obtained of 55° Bé. density containing about 55 per cent of the two phosphates with about 45 per cent water and not crystallizing above 102° F. With a 60 per cent neutralization, leaving 40 per cent monosodium phosphate, a 60° Bé. liquid crystallizing at 108° F. is obtained; this liquid containing about 60 per cent phosphate and about 40 per cent water.

In a specific embodiment of my invention, starting with rock phosphate, I produced a concentrated, pure, stable, liquid commercial preparation containing disodium phosphate and some monosodium phosphate. In this particular embodiment, fine ground Florida phosphate carrying 30 per cent $P_2O_5$ was treated with sulfuric acid. The batch used was 1000 pounds of raw phosphate and 900 pounds of 77 per cent $H_2SO_4$. An acid liquid was produced containing both phosphoric acid and acid calcium phosphate; the ratio of the two forms of $P_2O_5$ being about 3:1. The insoluble residue of calcium sulfate and gangue was washed and sent out of the system. It contained only a negligible amount of $P_2O_5$. The acid liquor contained some hydrofluosilicic acid and to get rid of this, a little sodium sulfate was added, giving a precipitate containing sodium hydrofluosilicate and calcium sulfate. The filtered acid liquor, mixed with some recycled acid liquor from a later operation, was treated with sodium sulfate in an amount about sufficient to precipitate the calcium as calcium sulfate. A good grade of commercial calcium sulfate was precipitated and this was removed and sent out of the system. The filtrate was treated with the amount of sodium carbonate necessary to convert free phosphoric acid into monosodium phosphate; the amount required to make the liquid neutral to methyl orange. A precipitate was formed containing iron oxid, alumina and some $P_2O_5$. The filtered liquor was concentrated and cooled to deposit crystals of monosodium phosphate; mother liquor being recycled.

So far, the operation was as described in my prior Patent No. 1,961,127.

In the present invention, instead of dissolving the monosodium phosphate crystals and neutralizing the solution completely to disodium phosphate, first with soda ash and then with caustic soda, the final neutralization with caustic soda was omitted. In one operation, the wet monosodium phosphate crystals were melted in their water of crystallization by heating to a temperature of about 150° F. Temperatures between 125° and 200° F. can be used. An aqueous liquid was obtained of about 60° Bé.; containing approximately 93 per cent $NaH_2PO_4.2H_2O$ and 7 per cent $H_2O$ as free water. To this hot liquid was added a saturated solution of soda ash in quantity sufficient only to convert 80 per cent of the monosodium phosphate to the disodium phosphate; giving a 4:1 molecular ratio of disodium to monosodium phosphate in the solution. The liquid resulting was then of about 51° Bé. density; containing approximately 52 per cent sodium phosphates with 48 per cent water. This solution could be stored and handled at any temperature above about 108° F. without deposition of crystals. A solution of somewhat lower phosphate content, 30° Bé., for example, can be kept at ordinary temperatures without crystallization. A small addition of caustic soda or trisodium phosphate to this liquid preparation converts it to a solution of disodium phosphate. The manufacture, shipment and use of the liquid product containing a small proportion of monosodium phosphate in admixture with disodium phosphate not only obviated handling and dissolving the crystallized salt but also economized in transportation of water.

In another embodiment of the present invention, another and similar lot of strong solution of monosodium phosphate was neutralized with soda ash as before; neutralization being to about 80 per cent of theory. The hot liquid was brought to a concentration about 48° Bé. and cooled to about 75° F., and during the cooling a crop of crystals of the heptahydrated disodium phosphate was deposited; all the monosodium phosphate remaining in the mother liquor. The mother liquor was then neutralized as before, to about 80 per cent disodium phosphate. On concentration and cooling, it gave another crop of heptahydrate.

In the end, all the monosodium phosphate was converted to disodium phosphate, but by the use of soda ash alone, no caustic soda being used.

In still another embodiment of the present invention, a hot solution of monosodium phosphate of about 50 Bé. was 80 per cent neutralized by soda ash solution with dilution to 40° Bé. Upon cooling to atmospheric temperature, a crop of crystals of the dodecahydrate was obtained.

What I claim is:—

1. As a new article of manufacture, a liquid preparation of disodium phosphate consisting of a purified aqueous solution of disodium phosphate substantially free of sulfate and of fluosilicate and containing less than 60 per cent water and a minor proportion of monosodium phosphate in amount sufficient to hold the crystallizing point of the liquid below 115° F.

2. A liquid preparation of phosphate of soda consisting of an aqueous liquid of 40° to 60° Baumé containing disodium phosphate and monosodium phosphate in molecular proportions of 60 to 85 per cent disodium phosphate with 40 to 15 per cent monosodium phosphate.

3. A preparation of phosphate of soda consisting of an aqueous liquid containing less than 60 per cent water and disodium phosphate and monosodium phosphate in a molecular proportion of about 80 per cent disodium phosphate to about 20 per cent monosodium phosphate, said liquid being substantially free of sulfate and of fluosilicate.

4. In the production and use of a pure liquid hydrated disodium phosphate containing less than 60 per cent water, a process of coldproofing the liquid against crystallization at temperatures below 115° F. which comprises incorporating in said liquid monosodium phosphate in a molecular ratio between 15 and 40 per cent of the total phosphates.

5. A process of making a purified liquid sodium phosphate preparation which comprises dissolving purified and crystallized monosodium phosphate in a limited amount of water, the total amount of water being less than that required to furnish the water of crystallization of $Na_2HPO_4.12H_2O$ subsequently formed, and neutralizing the greater part but not all of the monosodium phosphate in the solution to disodium phosphate to produce a substantially pure liquid phosphate of soda preparation containing less than 60 per cent water.

6. A process of making a purified liquid sodium phosphate preparation which comprises dissolving purified and crystallized monosodium phosphate in a limited amount of water, the total amount of water being less than that required to furnish the water of crystallization of $Na_2HPO_4.12H_2O$ subsequently formed, and neutralizing from 60 to 85 per cent of the monosodium phosphate in said solution to disodium phosphate to produce a substantially pure concentrated phosphate solution.

7. In the production of alkaline sodium phosphates from natural calcium phosphates by extraction of phosphoric acid in aqueous solution followed by neutralization, with an intermediate purification by crystallization and re-solution of monosodium phosphate, the process improvement which comprises neutralizing from 60 to 85 per cent of the monosodium phosphate in the solution with sodium carbonate to disodium phosphate, and adjusting the concentration of the solution to produce a substantially pure phosphate solution having a water content less than 60 per cent.

8. The process of claim 7 wherein the concentrated solution is stored as such and kept from crystallizing.

9. The process of claim 7 wherein the partially neutralized solution is concentrated and then cooled under conditions permitting crystallization of a hydrated form of disodium phosphate.

10. The process of claim 7 wherein the partially neutralized solution is concentrated and then cooled under conditions permitting crystallization of the heptahydrated disodium phosphate, $Na_2HPO_4.7H_2O$.

11. The process of claim 7 wherein the partially neutralized solution is concentrated and then cooled under conditions permitting crystallization of the dodecahydrated disodium phosphate, $Na_2HPO_4.12H_2O$.

12. In the economical preparation of crystallized heptahydrated disodium phosphate from calcium phosphates by a process of acidifying such a phosphate with sulfuric acid so as to bring a part, but not all, of the calcium into solution, precipitating the calcium from the solution so produced with sodium sulfate, neutralizing with sodium carbonate to form monosodium phosphate and removing the precipitate of iron and aluminum phosphates so produced, an improvement which comprises crystallizing monosodium phosphate in purified form from the liquor so produced, redissolving the monosodium phosphate crystals in water, converting from 60 to 85 per cent of the monosodium phosphate in the solution into disodium phosphate by neutralization with sodium carbonate, adjusting the concentration of the solution to produce a concentrated liquid preparation giving crystals only at a low temperature, cooling below this temperature to cause a crystallization of heptahydrated disodium phosphate, removing the crystals and again partially neutralizing the mother liquor with sodium carbonate to a point between 60 and 85 per cent disodium phosphate and producing a new crop of crystals of heptahydrated disodium phosphate therefrom.

13. A method of converting monosodium phosphate to disodium phosphate without the use of caustic soda to complete the conversion which comprises partially neutralizing a purified solution of monosodium phosphate to disodium phosphate by addition of sodium carbonate to the solution sufficient to convert from 60 to 85 per cent of the monosodium phosphate, concentrating the solution and crystallizing hydrated disodium phosphate therefrom leaving a mother liquor containing the unneutralized monosodium phosphate, adding sodium carbonate to the mother liquor to again convert from 60 to 85 per cent of the monosodium to disodium phosphate and crystallizing further quantities of disodium phosphate from said partially neutralized liquor.

14. A process of making a stable liquid sodium phosphate preparation which comprises neutralizing an aqueous solution of monosodium phosphate by addition of sodium carbonate to the solution until about 75 to 85 per cent of the monosodium phosphate is converted to disodium phosphate and adjusting the concentration of the solution to obtain a liquid containing less than 60 per cent water.

15. In the production of phosphate of soda from natural calcium phosphates by an improved process comprising production of a phosphoric acid liquor by extracting the natural phosphate with mineral acid and precipitation of iron and alumina as insoluble phosphates from said acid liquor by neutralizing the phosphoric acid therein to monosodium phosphate with separation of said neutralized liquor from said precipitated phosphates, a further improvement of the process which comprises recovering purified monosodium phosphate crystals from said liquor, dissolving the crystals in water, partially neutralizing the solution with sodium carbonate to convert 60 to 85 per cent of the monosodium phosphate to disodium phosphate and adjusting the concentration of the partially neutralized solution to produce a purified liquid phosphate of soda preparation containing less than 60 per cent water and having a crystallizing point below 115° F.

JOHN HARRY COLEMAN.

CERTIFICATE OF CORRECTION.

Patent No. 2,062,866.  December 1, 1936.

JOHN HARRY COLEMAN.

It is hereby certified that error appears in the printed specification of the above numbered patent requiring correction as follows: Page 4, second column, line 54, claim 13, after the word "monosodium" insert to disodium; and that the said Letters Patent should be read with this correction therein that the same may conform to the record of the case in the Patent Office.

Signed and sealed this 2nd day of February, A. D. 1937.

(Seal)

Leslie Frazer
Acting Commissioner of Patents.